J. T. HENINGER.
HAY COCKER.
APPLICATION FILED JAN. 29, 1916.

1,204,661.

Patented Nov. 14, 1916.
3 SHEETS—SHEET 2.

WITNESS

INVENTOR
J. T. HENINGER

BY Featherstonhaugh & Co.
ATTYS.

J. T. HENINGER.
HAY COCKER.
APPLICATION FILED JAN. 29, 1916.
1,204,661.
Patented Nov. 14, 1916.
3 SHEETS—SHEET 3.
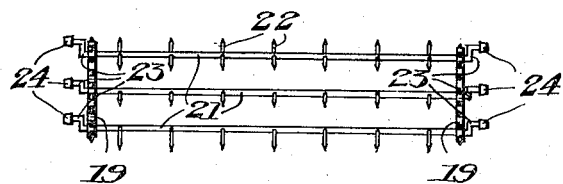
Fig.3.
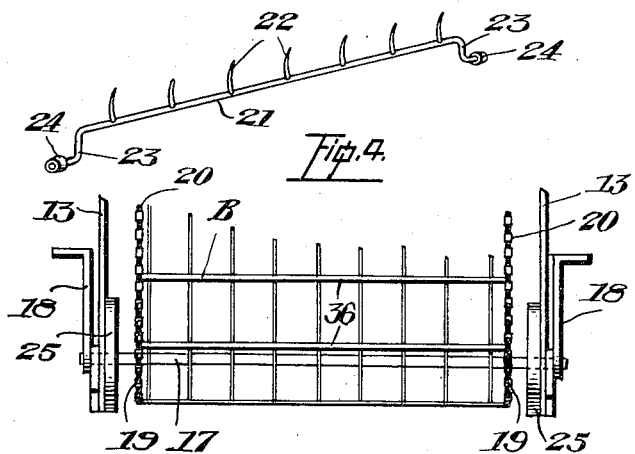
Fig.4.
Fig.5.
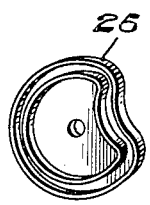
Fig.6.
WITNESS
INVENTOR
J. T. HENINGER.
BY Featherstonhaugh & Co.
ATT'YS.

UNITED STATES PATENT OFFICE.

JOHN TAYLOR HENINGER, OF WELLING, ALBERTA, CANADA.

HAY-COCKER.

1,204,661.

Specification of Letters Patent.

Patented Nov. 14, 1916.

Application filed January 29, 1916. Serial No. 75,097.

*To all whom it may concern:*

Be it known that I, JOHN TAYLOR HENINGER, a subject of the King of Great Britain, and resident of Welling, in the Province of Alberta, Dominion of Canada, have invented certain new and useful Improvements in Hay-Cockers, of which the following is the specification.

This invention relates to improvements in hay cockers.

At the present time it is the usual practice to wind row the hay by means of the ordinary horse rake, after which the hay is manually cocked, the process involving a considerable amount of time and labor, and one of the objects of the present invention is to overcome this objection and to render it possible to rake and cock the hay mechanically in one continuous operation.

Further objects are to simplify the construction of the machine and render the several parts better able to perform the functions required of them.

With the above objects in view the invention consists essentially of the improved construction particularly described and set forth in the following specification and accompanying drawings forming part of the same.

Figure 1:
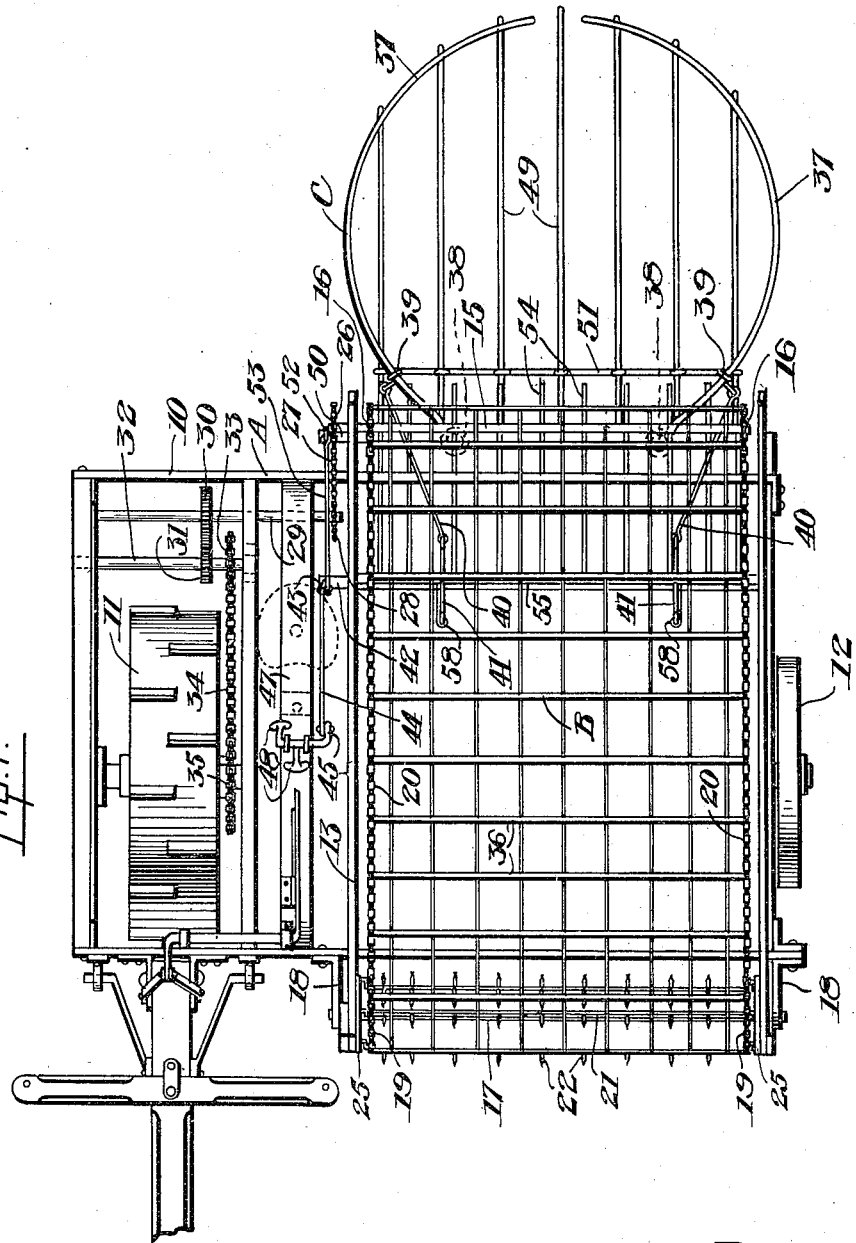
Figure 2:
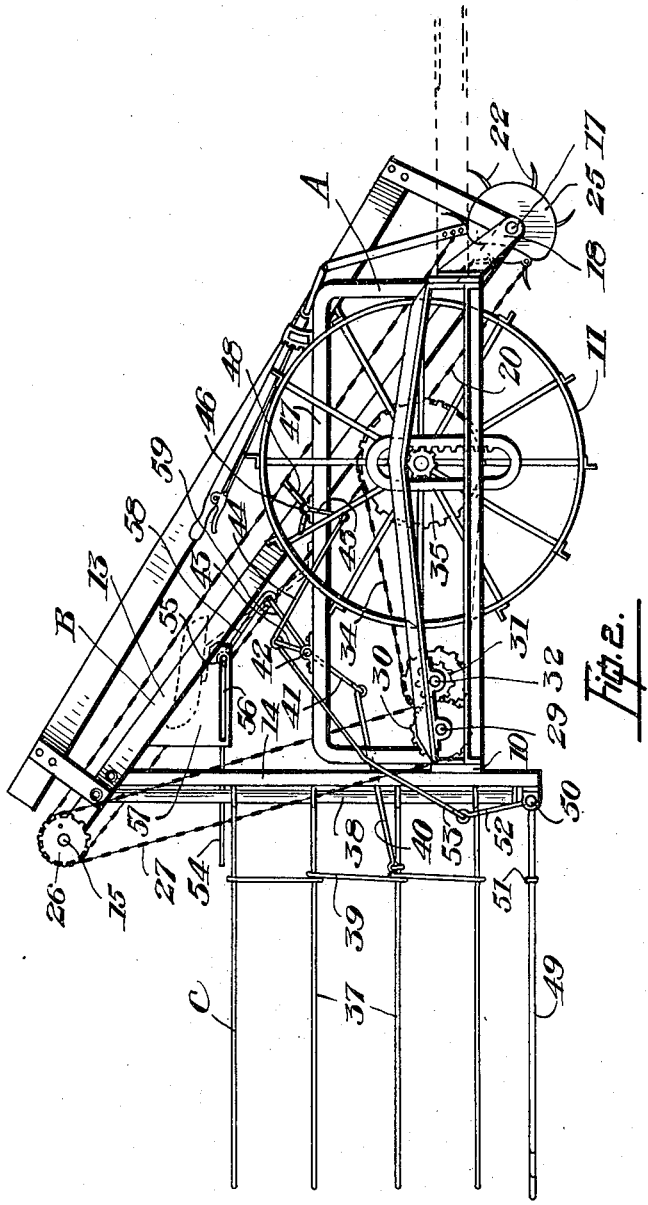

In the drawings, Figure 1 is a plan view of the improved machine. Fig. 2 is a side elevation of the same. Fig. 3 is a plan view of the pick-up. Fig. 4 is a perspective view of one of the fork carrying rods showing the crank ends and rollers mounted thereon. Fig. 5 is a plan view of the lower end of the elevator with the cams mounted thereon. Fig. 6 is a perspective view of the cam co-acting with the rollers carried by the fork carrying rods.

Like characters of reference refer to like parts in the several figures.

Referring to the drawings, A represents the improved machine comprising the main frame 10 having the driving and ground wheels 11 and 12 suitably journaled thereon. This main frame is designed to carry the frame 13 of the elevator conveyer B which is supported at the front end in any usual manner, while the rear end of the said elevator is supported by the standards 14 from the main frame.

The elevator B consists of a transversely extending shaft 15 carrying a pair of spaced sprockets 16 and is journaled in the upper end of the frame 13, while at the lower end a transversely extending shaft 17 passes through the frame 13 and is rotatably supported in the bearings 18 mounted on the main frame. The shaft 17 is provided intermediate of its length with a pair of sprockets 19 rigidly attached thereto and operatively connected by the chains 20 with the sprockets 16.

Rotatably mounted on the sprockets 19 are a plurality of transversely extending rods 21 provided intermediate of their ends with forks 22 adapted during the operation of the machine to pick up the hay, the rods being provided with crank ends 23 carrying rollers 24 rotatably mounted thereon and designed to engage with the cam race 25 carried by the frame 13.

The transversely extending shaft 15 is also provided with a sprocket 26 operatively connected by the chain 27 to the sprocket 28 mounted on one end of the shaft 29, which is provided intermediate of its ends with a pinion wheel 30 meshing with the pinion wheel 31 carried by the intermediate shaft 32 which is further provided with a sprocket 33 adapted to be driven by the chain 34 from the sprocket 35 rigidly attached to the driving wheel 11.

The chains connecting the sprockets 19 and 16 carry a plurality of transversely extending slats 36 thereon so forming an endless conveyer on which the hay engaged by the pick-up is deposited.

Below the rear end of the elevator B a basket C is mounted which is of unique construction comprising a pair of movable side members 37 hinged to the standards 38 carried by the frames 10 and 13, each member consisting of a plurality of curvilinear arms connected intermediate of their length by the vertically disposed member 39 designed to adequately strengthen the said arms.

The side members 37 are adapted to be simultaneously opened and closed, and to this end I provide a link 40 connected at one end to the side members 37 and at the other end to a downwardly disposed crank member 41 carried by the transversely extending shaft 42 which is further provided with a crank member 43 operatively connected by the link 44 to the crank member 45 rotatably mounted in the bearing 46 carried by the standards 47 supported from the frame 10. The crank member 45 is provided with a pair of foot pedals 48 by means of which rotary motion in the desired direction may be transmitted thereto.

Coöperating with the side members 37 of the basket C is a bottom 49 consisting of a plurality of fingers which are normally horizontally disposed and carried by the spindle 50 rotatably mounted on the frame 10, the said fingers being braced intermediate of their ends by the transversely extending member 51.

The spindle 50 is provided with a crank arm 52 pivotally connected to one end of the offset link 53, the other end being connected to the crank member 43 so that when the side members 37 of the basket are rotated laterally to open or close the same the bottom 49 is simultaneously actuated.

While the hay delivered to the basket C is being deposited in the form of a cock it is essential that the hay being carried up on the elevator conveyer B should not be allowed to be discharged and stray along the ground and to obviate this I provide a guard 54 for the said basket. This guard may be in the form of a grid and in the embodiment illustrated comprises a plurality of fingers operatively connected by a transversely extending rod 55, the ends of which are slidably mounted in the slot 56 of the bracket 57 carried by the frame 13 of the elevator B, the said rod being operatively connected by the link 58 to the crank member 59 carried by the transversely extending shaft 42.

The assembly of the machine will be readily understood from the foregoing description.

When a machine of this type is in use a team of horses or other draft may be suitably employed to give the necessary traction and the motion is transmitted from the driving wheel 11 through the sprocket 35 and chain 34 to the shaft 32 and thence through the intermediate gearing to the shaft 29 transmitting rotary motion to the sprocket 28, thence to the sprocket 26 and shaft 15. In this way motion is transmitted to the endless conveyer B and the forks 22 coming in contact with the hay engages the same and deposits it on the slats 36 of the conveyer which in turn elevate the hay and deposit it in the basket C. During the operation of the pick up mechanism it should be particularly noted that when the forks 22 carried by the transversely extending rods 21 reach the crest of the cam 25, the rollers 24 are displaced radially inwardly rotating the rods 21 backwardly so that the forks 22 clear the hay and are rotated below the upper face of the conveyer and when the rollers 24 disengage from the lowest portion of the cam 25 the said rollers are displaced radially outwardly rotating the rods 21 forwardly and so projecting the forks 22 beyond the face of the slats 36 to engage the hay and deposit the same on the conveyer. When the desired amount of hay has been delivered to the basket C the driver operates the foot pedal 48 so transmitting rotary motion through the crank member 45 and link 44 to the transversely extending shaft 42, thence through the several crank and link mechanisms to the side members 37 of the basket C and the bottom 49 opening the said side members and rotating the bottom downwardly, while at the same time the guard 54 is pushed rearwardly over the top of the basket and any hay discharged from the upper end of the conveyer B falls on the said guard and is held thereon until the basket is again closed, when the guard 54 is simultaneously retracted to its normal position, the hay being then deposited in the basket.

From this description it will be seen that I have invented a hay cocker wherein the raking and cocking can be performed in a single continuous operation, thereby effecting considerable saving in time and labor, and in which the several parts are of the simplest possible structure compatible with durability and not likely to go out of repair.

As many changes could be made in the above construction and many apparently widely different embodiments of my invention, within the scope of the claims, constructed without departing from the spirit or scope thereof, it is intended that all matter contained in the accompanying specifications and drawings shall be interpreted as illustrative and not in a limiting sense.

What I claim as my invention is:

1. A machine of the class described including a dumping basket, a guard for the basket, comprising a sliding grid operative only when the basket is in dumping position, and means for operating the guard comprising guideways, projections from the guard sliding in the guides, a driven shaft, and links connecting the shaft to the guard.

2. A machine of the class described including an elevator, a pickup co-acting with the elevator, means for simultaneously operating the pick up and the elevator, a basket located below the rear of the elevator provided with a pair of side members, a bottom for the basket, a normally withdrawn sliding grid for guarding the basket, plates depending from the elevator having a slot therein, projections from the grid sliding in the slots, a driven shaft, and links connecting the shaft to the grid.

In witness whereof I have hereunto set my hand in the presence of two witnesses.

JOHN TAYLOR HENINGER.

Witnesses:
JAMES MITCHELL,
B. HARVEY.